Aug. 19, 1941.  F. W. COTTERMAN  2,253,017
FLYTRAP
Filed April 18, 1939  3 Sheets-Sheet 2

INVENTOR.
Frederick W. Cotterman

INVENTOR.
Frederick W. Cotterman

Patented Aug. 19, 1941

2,253,017

UNITED STATES PATENT OFFICE 2,253,017

FLYTRAP

Frederick W. Cotterman, Dayton, Ohio, assignor to Bessie D. Apple, Dayton, Ohio

Application April 18, 1939, Serial No. 268,614

4 Claims. (Cl. 43—111)

This invention relates to insect catching mechanism and more particularly to flytraps.

It is a generally accepted belief that flies are carriers of disease germs, and, while many traps have been offered which are relatively ecective as far as catching the flies is concerned, all of them are objectionable because the devices are so constructed that the entrapped insects are transferred from the trap to a container in which they are killed and from which they are then removed, an operation which is not only distasteful but one which may subject an individual to the very contamination which it is intended to prevent.

It is therefore an object of this invention to so construct and arrange an embodiment thereof that the danger of contamination is minimized, by providing a disposal box for the entrapped flies which, being made of paper or similar cheap material and completely closed, is used but once then thrown away and replaced by a fresh one.

Another object is to construct the disposal box in the form of a drawer which may slide into a space in the cabinet of the trap and thereby not only be out of the way so as to make a neat appearing structure but also to be supported and protected against breakage or distortion.

Another object is to provide the paper disposal box or drawer with a permanently closed window in one side and with a gateway which is normally closed, but which is automatically pushed open by mere insertion of the drawer in the cabinet, whereby a way is provided thru which the entrapped insects may migrate from the dark interior of the trap to the lighted interior of the drawer, the gateway in the drawer being adapted to automatically close when a fly filled drawer is withdrawn from the cabinet to be replaced by a fresh one.

Another object is to provide a trap door in the wall of the cabinet adjacent the gateway in the disposal drawer, said trap door also being automatically opened by mere insertion of the disposal drawer in the cabinet, and automatically closed by withdrawal of the drawer, to the end that when a full drawer is withdrawn, any flies remaining in the cabinet will not be able to escape from the cabinet unless a new drawer is inserted and may then pass only from the cabinet into the drawer.

The invention herein disclosed is embodied in one of the class of traps wherein the insects are attracted to the trap by means of some kind of bait, and it is known that to be effective such bait must be moist and preferably in a state of fermentation, and it is therefore another object of this invention to provide a bait carrying element which will absorb a large volume of liquid bait and hold the moisture for an extended period, to the end that frequent attention and renewal of the bait is unnecessary.

Other objects, meritorious features and advantages will become apparent from a consideration of the following description when taken in conjunction with the drawings, wherein, Fig. 1 is a top plan view of an embodiment of the invention.

Similar numerals refer to similar parts thruout the several views.

Figure 1:
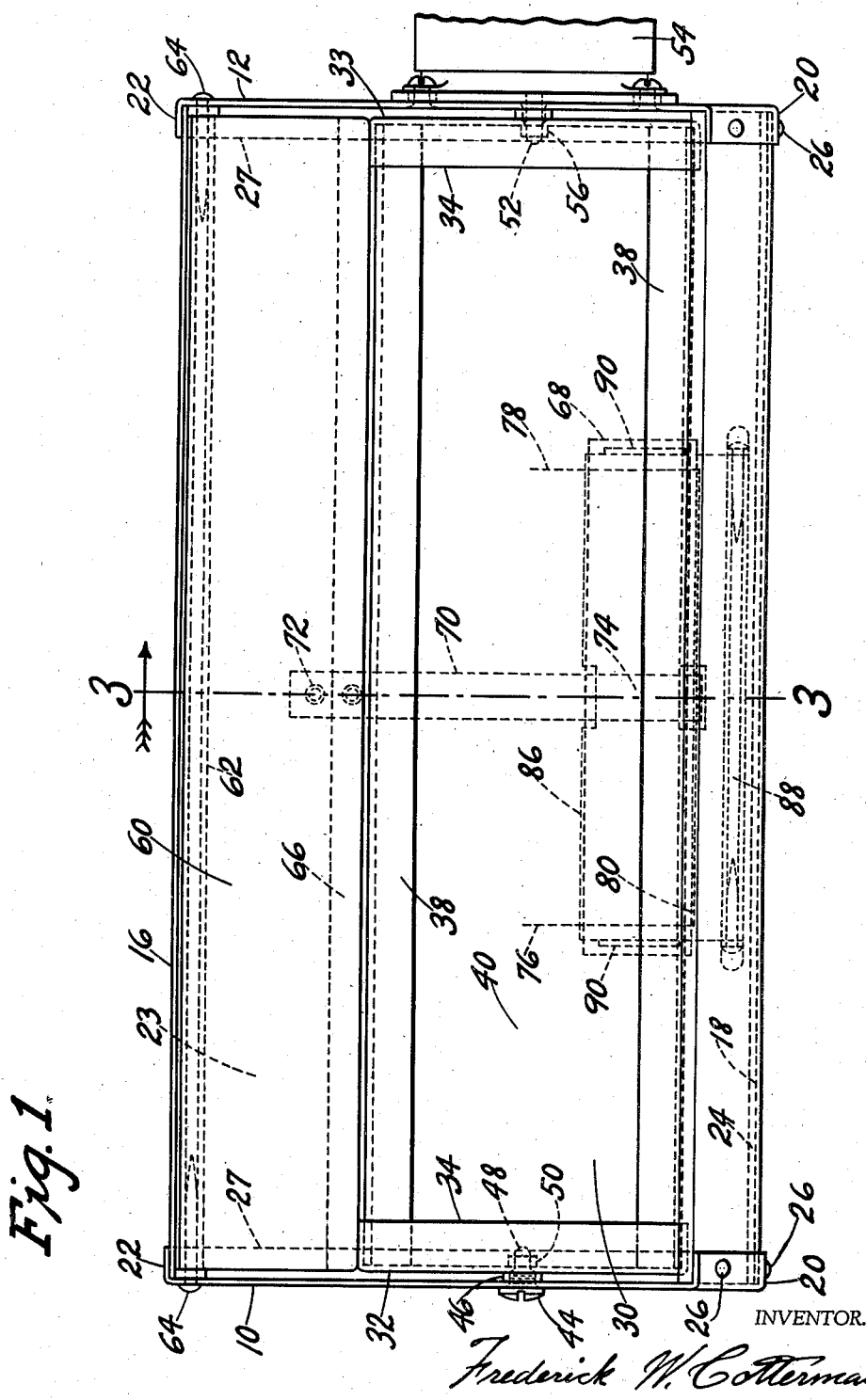

The particular embodiment of the invention shown has a sheet metal cabinet comprising two end members 10 and 12 held in spaced apart relation by several longitudinal members, one comprising in one piece a lower floor 14 and a back 16 and another comprising in another piece an upper floor 17 and front 18.

Figure 2:
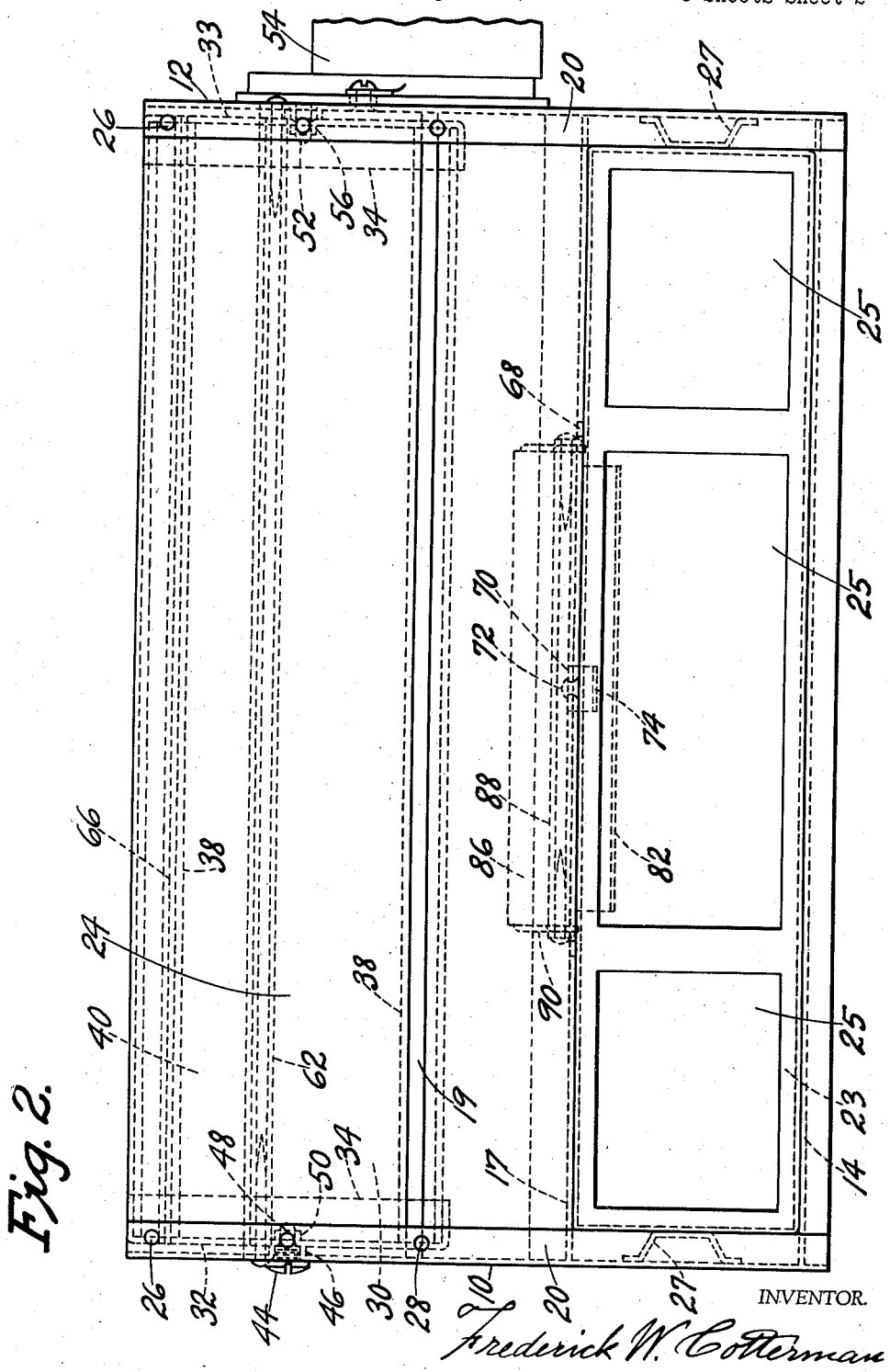
Fig. 2 is a front elevation.

The end members 10 and 12 have flanged over edges 20 and 22 to the inside of which the members 14—16 and 17—18 are secured, preferably by spot welding, soldering or similar means. A drawer 23 of cardboard, paper or similar material, closed on all sides as well as top and bottom, but with Cellophane windows 25 in the front, is removably slidable in the space between the upper floor 17 and the lower floor 14. Pressed sheet metal guide members 27 (see Fig. 2) position the drawer endwise in the cabinet.

A convex window 24 which may preferably be made of transparent plastic material extends the full length between the end members 10 and 12 and is held to the curved portion of the flanges 20 and 22 by rivets 26, and where riveting is difficult, by the small bolts 28.

The front 18 is bent inward at 19 and then downward at 21 (see Fig. 3), the inner face of the portion 21 being curved to the radius of the window 24.

Rotatably mounted in the upper portion of the cabinet between the end members 10 and 12 is the tetragonal prism 30 which comprises two pressed sheet metal end heads 32 and 33 with flanged over edges 34, the corners of which are rounded as at 36 (see Fig. 3), and fitted into the rounded corner of the heads are four struts 38 of "angle iron" cross section with the corners appropriately rounded to correspond to the heads.

The struts may be secured to the heads by soldering, welding, or similar means and when so assembled hold the heads axially spaced apart at opposite ends of the cabinet, thereby providing an open framework into which a core 40 of sponge rubber, synthetic sponge or similar material may be inserted.

The prism 30 is rotatably mounted at one end on the bronze bearing screw 44 which is threaded into a small hub 46 in the end member 10 but has a smooth part 48 without threads which extends into the small hub 50 of the prism head 32.

At the other end the prism 30 is rotatably mounted directly on the output shaft 52 of a small one R. P. M. electric clock motor 54, the end of the shaft 52 being made hexagonal to provide a driving connection with a hexagonal hole in the small hub 56 of the end head 33 into which the output shaft 52 extends. The inner radius of the convex window 24 is formed and positioned to just clear the rounded corners 58 of the struts 38 as it rotates. Rotation is in the direction of the arrow 59 (see Fig. 3).

A scraper 60 of the same length as the prism 30 has the rear edge curled as at 62. Small nails 64 are driven thru holes in the end members 10 and 12 into the curled portion 62 whereby the scraper may oscillate as the prism revolves. The front edge of the scraper is bent back upon itself as at 66 to add strength to the structure as well as to provide a smoother edge.

Since the flanged over edges 34 of the end heads 32 and 33 extend over the outside of the "angle iron" struts 38, it will be obvious that, as the prism rotates, the scraper will bear only on the flanged over portions 34, and will therefore not touch the core of sponge rubber 40 nor the struts 38 although it will come very close to them.

A rectangular opening 68 extends thru the upper floor 17. A flat spring 70, secured to the top surface of the upper floor by rivets 72 extends transversely of the floor and across the opening 68, resting on both edges. Where the spring crosses the opening it is bent to form the camming lobe 74 which extends downward thru the opening 68 into the drawer space.

Figure 3:
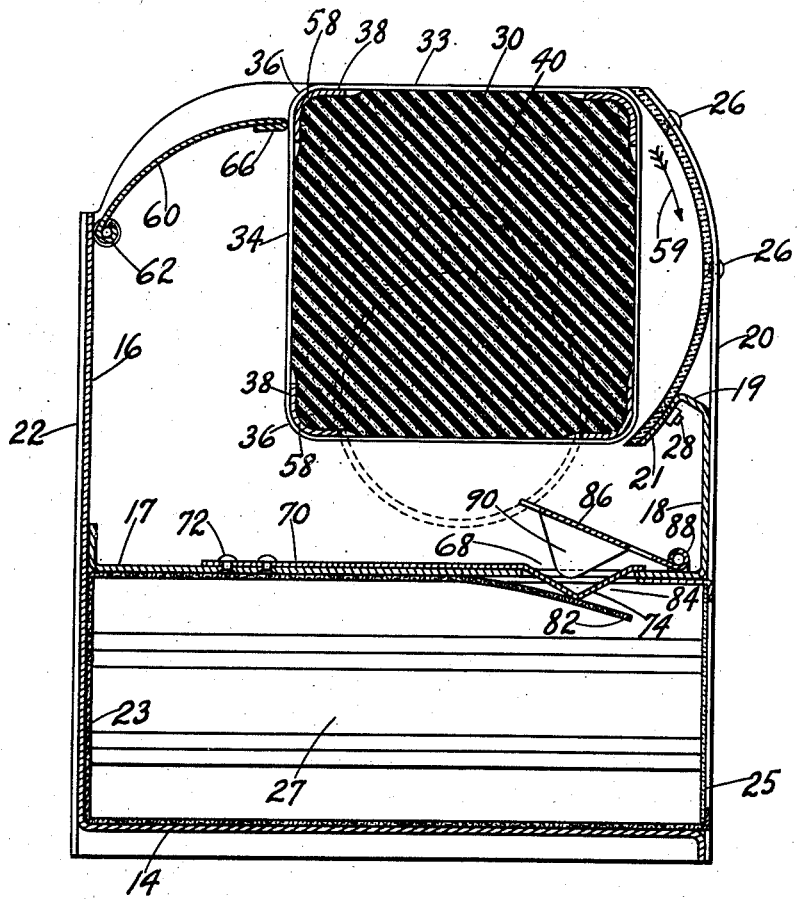
Fig. 3 is a transverse section taken on the line 3—3 of Fig. 1.

The top wall of the cardboard drawer 23 has a slit cut thru it, the slit comprising two transverse cuts 76 and 78 joined by a longitudinal cut 80 (see Fig. 1), whereby there is provided, in the top wall of the drawer, a flap 82 which is bendable downwardly, as shown in Fig. 3, by camming lobe 74 when the drawer is pushed into place.

As a cardboard drawer 23 is being entered into the drawer space, the more rigid portions of the drawer, which must pass under the lobe 74, raise the lobe up against the stress of the spring 70, but when the flap 82 reaches the proper place under the lobe, the spring forces the lobe downward on the flap and opens up a long narrow passageway 84 which faces the Cellophane window 25 in the front of the drawer.

A trap door 86 is hinged at 88 to the upper floor 17 in a position to drop and cover the rectangular opening 68 in the upper floor. At each end of the trap door a lobe 90 extends downwardly thru the opening 68 and rests on the top wall of the cardboard drawer 23. The lobes 90 are spread far enough apart to straddle the flap 82 and rest on the top wall of the drawer whereby the lobes keep the door in the open position shown as long as the drawer remains in place, but permits it to assume the closed position by simple withdrawal of the drawer.

It follows that, in operation, the simple insertion of a new cardboard drawer 23 into place in the cabinet not only opens the flap 82 of the drawer but also opens the trap door 86 in the upper floor 17, while simple withdrawal of a filled drawer not only closes the flap 82 to prevent flies escaping from the removed drawer but drops the trap door 86 to prevent such flies as have not yet migrated from the top into the drawer from escaping from the trap into the open.

Several times during the fly season the core 40 should be saturated with some liquid which attracts the insects. Further operation consists of inserting a drawer 23 and starting the motor. The number of times the cardboard drawer needs to be exchanged for a fresh one will of course depend on the prevalence of the insects which will vary with the location and season. The filled drawer may be disposed of along with other rubbish. Flies caught in a drawer will soon succumb after which it will make no difference if such drawers which have been deposited in rubbish receptacles are accidentally broken open.

The idea of employing a rotating prism with one side adjacent a curved window and the other contacting an oscillating scraper, is broadly old and its operative principle of attracting insects to the flat sides of the slowly revolving prism and turning the flat sides until the insects find themselves between a prism side and the curved window, and later in the darkened interior of the cabinet, is well understood and is not herein claimed alone, the novelty of the present invention consisting more especially in a method and means of disposing of the insects, with minimum bother and danger of contamination, after they are brought to the darkened interior of the trap, and the structure of the prism.

From the foregoing description it will be apparent that the personal attention which must be given the device to maintain it in operation does not include the distasteful operation of killing and removing the flies nor in any way subject the operator to the danger of contamination from contact with them, nor does it include frequent renewal of the bait.

Furthermore, the device has a neat appearance and is designed to give maximum capacity in a small space.

Having described an embodiment of my invention in which the objects hereinbefore enumerated are attained, I claim, 1. The combination of an insect trapping means comprising a receptacle having a chamber with an elongated exit opening and means to entrap insects in said chamber, with a sanitary renewable disposal means in the form of a container of cardboard or the like, completely sealed except for a self closing flap in one wall thereof, means to hold said container positioned with said flap alongside said exit opening, means extending from said receptacle thru said exit opening and pressing on one edge of said flap to sold it open only so long as said container is held so positioned, a self closing door over the exit opening, and propping means extending from said door thru said exit opening and resting against said container beyond said flap to hold said door open only so long as said container is so positioned.

2. The combination in insect catching apparatus of a cabinet, a partition dividing the interior of said cabinet into a trapping compartment and a drawer space, means to entrap insects in a chamber in the trapping compartment, a sanitary renewable sealed disposal drawer of cardboard or the like slidable into the drawer space, said partition having an exit opening from said chamber and said drawer having a self closing flap adjacent said exit opening, means extending into said drawer space adjacent said flap to press on said drawer and open said flap when said drawer is pushed to its fully entered position, a self closing door for said exit and means on said door adapted to rest on said drawer and hold said door open as long as said drawer remains in place.

3. The combination, in an insect trap, of a cabinet having a chamber and a drawer space, trapping mechanism adapted to entrap insects and deposit them in the chamber within the cabinet, a partition wall in said cabinet separating the chamber from said drawer space, a sanitary sealed disposal drawer of cardboard or the like slidable into the drawer space, said partition having an elongated exit opening from said chamber and said drawer having a self closing flap alongside said exit opening, a resilient member extending from said chamber thru said exit opening into said drawer space adapted to yield and move back into said chamber when the drawer is being moved into the drawer space but adapted to expand and push open said flap when it reaches a position on said drawer adjacent said flap, said position being reached when said drawer is pushed all the way into place.

4. An insect trap comprising, in combination, a cabinet containing a chamber and a drawer space, trapping mechanism in the upper portion of said cabinet comprising means to entrap insects and deposit them in the chamber in the cabinet, a partition separating said chamber from said drawer space in the cabinet, a sealed drawer of cardboard or the like slidable into the drawer space, said partition having an elongated opening providing an exit from the said chamber and said drawer having a self closing flap alongside said opening, a self closing door for said exit opening, a resilient flap opening member positioned to press on said drawer adjacent said flap to open said flap when said drawer is pushed all the way into place but adapted to yield and move out of said drawer space when said drawer is being inserted or withdrawn, and means adapted to rest on said drawer when it is in place to hold said door propped open.

FREDERICK W. COTTERMAN.